Patented Oct. 9, 1945

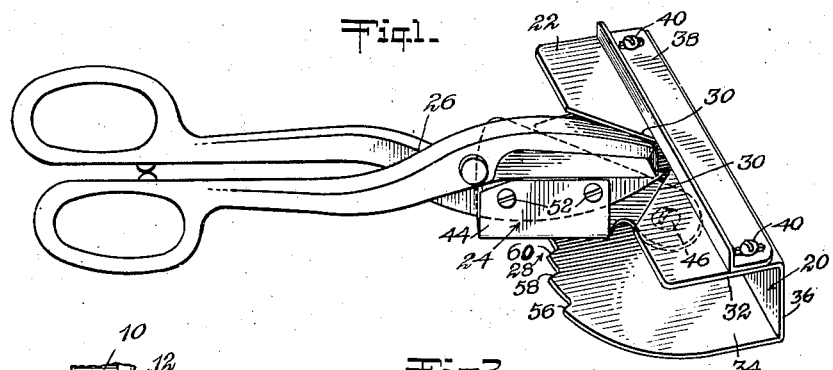
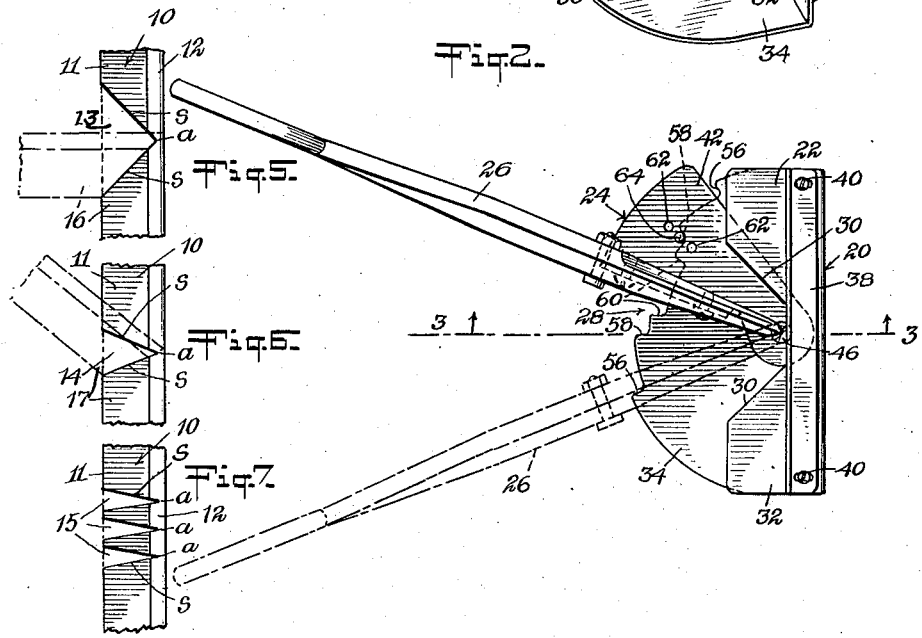
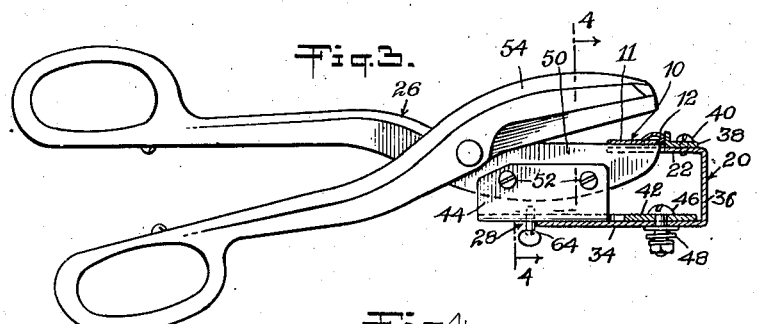
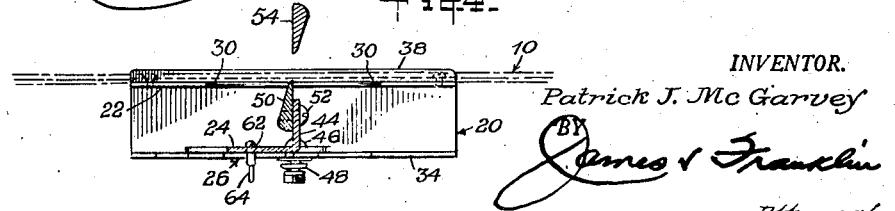

2,386,330

UNITED STATES PATENT OFFICE 2,386,330

ANGLE GAUGE AND CUTTING TOOL

Patrick Joseph McGarvey, Floral Park, N. Y.

Application January 23, 1945, Serial No. 574,103

7 Claims. (Cl. 30—233)

This invention relates to an angle gauge and cutting tool.

The prime object of the invention centers about the provision of an angle gauge and cutting tool for variably determining the angle of a segment to be cut from a work strip and for excising such segment from the strip.

In the structure of the invention exemplified in the present application, the angle gauge and cutting tool is designed for cutting out any of a number of different angled corners in refrigerator door gaskets. In fitting rubber gasket strips to refrigerator doors, it is necessary to excise angle segments from the gasket strip to fashion the angled corners of the gasket. A number of door corner angles are met with in practice, such as a 45° angle, a 90° angle, as well as a curved or rounded corner. When the angle of the segments is determined by eye or templet and the segment cut out by hand, according to present practice, the resulting corner produced is not accurate and the operation is relatively time consuming even when performed by a skillful operator. By means of the gauge and cutter of the present invention the angular segments of any desired angle met with in practice may be mechanically measured or determined and then excised with both precision and speed.

To the accomplishment of this object, and such other objects as may hereinafter appear, my invention relates to the angle gauge and cutting tool and the elements thereof as sought to be defined in the appended claims and as described in the following specification taken together with the accompanying drawing in which:

Fig. 1 is a perspective view of the angle gauge and cutting tool of the present invention;

Fig. 2 is a plan view thereof and is illustrative of the operation or mode of using the same;

Fig. 3 is a view of Fig. 2 taken in cross-section in the plane of the line 3—3 of Fig. 2;

Fig. 4 is a view of Fig. 3 taken in cross-section in the planes of the broken line 4—4 thereof;

Fig. 5 is a view of a work strip used therewith and illustrating the cutting out of a 90° segment and thereby forming a 90° corner angle therein;

Fig. 6 is a view similar to Fig. 5 and illustrating the cutting out of a 45° segment to procure a 135° corner in the work strip, and Fig. 7 is a view similar to Fig. 5 and illustrating the cutting out of a number of small angular segments to produce or fashion a curved or rounded corner in the work strip.

Referring now more in detail to the drawing, reference may be had first to Figs. 5, 6 and 7 thereof for a better understanding of the different functions desired to be accomplished by the angle gauge and cutting tool shown in the remaining figures. The work strip selected for exemplification of the invention is shown in these figures and comprises a rubber gasket strip, generally designated as 10, having a flat portion 11 and an edge bulbous portion 12, this type of rubber gasket being used for sealing refrigerator doors. To form the different angled corners met with in practice, it is necessary to excise from the work strip at precise locations thereon angular segments such as the 90° segment 13 shown in Fig. 5, or the 45° segment 14 shown in Fig. 6, or a series of small angular segments 15 such as shown in Fig. 7, to produce different angled corners such as the 90° corner 16 depicted in Fig. 5, a 135° corner 17 shown in Fig. 6, and a rounded or curved 90° corner obtainable with the configuration shown in Fig. 7. To do this with accuracy and speed it is essential to determine or fix with precision both the location of the apex $a$ or apices $a, a$, as well as the angle subtended by the sides $s, s$ of the different angular segments to be excised from the strip, and to do this for the different angles described.

The angle gauge and cutter shown in Figs. 1 to 4 of the drawing is constructed and designed to perform these described results. This gauge and cutter comprises a work and cutting tool holder, generally designated as 20, in which is embodied the three essential parts of the device, namely, a support 22 for the work strip, a carrier 24 for the cutting tool 26, and a gauge means generally designated as 28. The work strip 10 is adapted to be placed upon or laid over the support 22 therefor, as is shown in Figs. 3 and 4 of the drawing, with the part to be excised therefrom positioned at a cutting station 30 thereof, and the carrier 24 is moved between the extreme positions determined by the gauge means 28, as illustrated in Fig. 2 of the drawing, at which extreme positions the cutting tool 26 is operated for cutting the work strip at the cutting station along the two sides of the angle determined by said gauge means. Thereby the angular segment corresponding to said determined angle may be excised from the work strip to produce the precision angled corners described above in connection with Figs. 5, 6 and 7 of the drawing.

The work and cutting tool holder 20 may comprise the simple and inexpensive piece or unit shown, consisting of a member bent up from sheet material to provide the work support platform 32, the plate-shaped base 34 and the connecting web 36. The work support platform 32 has a central cutout portion or opening which defines the cutting station 30 above referred to. This platform is preferably provided with a work guide or straight edge in the form of a flanged strip 38 which may be adjustably fixed to the work platform 22 by the screw and slot means 40, 40.

The cutting tool carrier 24 is pivotally movable on the holder 20 about an axis related to the apex $a$ of the angles of the segments to be cut from the work strip, and in the exemplified structure of the invention this axis is made coincident with the apex of the segment angles. The carrier 24 may simply comprise a sector-shaped plate 42 formed with an upturned section 44, the plate being pivotally mounted on the base 34 by means of a pin or bolt 46, which mounting may be made resilient by means of the spring 48, the upturned section 44 being utilized for supporting the cutting tool 26 which preferably consists of a simple pair of shears. The lower blade 50 of the shears 26 is fixed in position by being attached, as by the screws 52, to the upturned section 44 of the carrier, this being preferably so mounted that the cutting edge of this blade is in the plane of the work support 22 as is best shown in Figs. 3 and 4 of the drawing; and the upper blade 54 of the shears is thereby movable across the cutting station or opening 30 of the work support for the excising operation.

For determining and varying the angled cut to be made in the work strip the gauge means 28 is provided as hereinbelow set forth. This gauge means comprises interengaging elements, one provided in a part of the holder 20 and the other provided in a part of the carrier 24. In the exemplified structure these interengaging elements comprise a member having a plurality of different arcuate openings differently spaced radially of the axis of the carrier, and a mating member adjustable radially of said axis, the said members being mounted one on the holder 20 and the other on the carrier 42, adjustment of the gauge means being obtained by relative movement radially between the mating member and the arcuate openings. The structure is maintained in its simple form by producing the arcuate openings in the base plate 34 of the holder 20 and in locating the radially adjustable mating means in the carrier 24. Accordingly, the base plate 34 is formed in its rear edge with a number of different arcuate openings corresponding to the different angled cuts to be made, such for example as the arcuate openings determined by the radial edges 56, 56, 58, 58, and 60, 60; and the carrier 24 is provided with the radially disposed tapped openings 62 for adjustably receiving the threaded pin 64. The arcuate opening determined by the radial edges 56, 56 corresponds to a 90° angle for the device (to produce the operation shown in Fig. 5) for which the threaded pin 64 is placed in the outermost opening 62 of the carrier 24; the arcuate opening determined by the radial edges 58, 58 corresponds to a 45° angle for the device (to produce the operation of Fig. 6 of the drawing) for which the threaded pin 64 is placed in the middle opening 62 of the carrier; and the arcuate opening determined by the radial edges 60, 60 corresponds to the small angle for the device (a plurality of which produces the operation shown in Fig. 7 of the drawing) for which the pin 64 is placed in the innermost opening 62 of the carrier. It will be observed that Figs. 2 to 4 show the parts adjusted for producing a 45° angle cut. For varying the angle all that has to be done is to radially adjust the position of the threaded pin 64 in the carrier 24.

The use and operation of the angle gauge and cutter of the present invention, and the advantages thereof, will be apparent from the above detailed description thereof. The work strip 10 is placed or laid upon the work support 22 and is moved therealong guided by the straight edge strip 38 until the apex $a$ of a segment to be cut therefrom is immediately above or coincident with the point of the fixed blade 50 of the cutting shears (in any position of the shears). The angle of a cut being previously determined, and the adjustable pin 64 being correspondingly previously located in the carrier 24, the gauge and cutter is immediately ready for the angle determined and the excising operations. With the work strip thus positioned, the operator takes hold of the shears 26 and moves the same with its carrier 24 to one position as, for example, the full line position shown in Figs. 1 to 3 of the drawing, this position being determined by the gauge means 28, and one side of the segment to be excised is cut by the transverse movement of the movable blade 54 of the shears. The operator, after moving the shears to the open position, then moves the same to the other extreme position as depicted by the dotted lines shown in Fig. 2 of the drawing, which position is also determined by the gauge means 28 and the cutting operation is repeated to cut the other side of the segment, thus completing the cutting operation. All of the segments are thereby accurately cut or excised from the strip with reference both to the exact apex $a$ and the exact angles subtended by the sides $s$, $s$, thereof. Adjustment from the angle may be readily made as described.

While I have shown my angle gauge and cutter in the preferred form, and as applied to a particular kind of work, it will be understood that the same may be adapted for other kinds of work and that many modifications may be made in the structure thereof without departing from the spirit of the invention defined in the following claims.

I claim:

1. An angle gauge and cutter for determining the angle of a segment to be cut from a work strip and for excising such segment from the strip comprising, a work and cutting tool holder, a support thereon for the work strip, said support having a cutting station over which the work strip is positionable, a cutting tool carrier on the holder pivotally movable thereon about an axis related to the apex of the angle of the segment to be cut from said work strip, gauge means on the holder for determining the size of the angle over which said carrier is movable, said gauge means being adjustable for varying the size of the angle, and said cutting tool holder being provided with a cutting tool for cutting the work strip at said cutting station along the two sides of the angle determined by said gauge means, whereby an angular segment corresponding to said determined angle may be excised from said work strip.

2. An angle gauge and cutter for determining the angle of a segment to be cut from a work strip and for excising such segment from the strip comprising, a work and cutting tool holder, a support thereon for the work strip, said support having a cutting station over which the work strip is positionable, a cutting tool carrier on the holder pivotally movable thereon about an axis related to the apex of the angle of the segment to be cut from said work strip, gauge means on the holder for determining the size of the angle over which said carrier is pivotally movable, said gauge means being adjustable for varying the size of the angle, and said cutting tool holder being provided with a cutting tool movable across the work strip for cutting the same at said cutting station along the two sides of the angle determined by said gauge means, whereby an angular segment corresponding to said determined angle may be excised from said work strip.

3. An angle gauge and cutter for determining the angle of a segment to be cut from a work strip and for excising such segment from the strip comprising, a work and cutting tool holder, a support thereon for the work strip, said support having an opening at its cutting station over which the work strip is positionable, a carrier for a pair of shears on the holder pivotally movable thereon about an axis related to the apex of the angle of the segment to be cut from said work strip, gauge means on the holder for determining the size of the angle over which said carrier is movable, said gauge means being adjustable for varying the size of the angle, and a pair of shears mounted on said carrier having a fixed blade whose cutting edge is in the plane of the work support and a movable blade movable across the said opening and the work strip for cutting the strip at said cutting station, the blades being thereby arranged to cut the strip along the two sides of the angle determined by said gauge means, whereby an angular segment corresponding to said determined angle may be excised from said work strip.

4. The angle gauge and cutter of claim 1 in which the gauge means comprises a member having a plurality of different arcuate openings differently spaced radially of the said axis and a mating member adjustable radially of said axis, the said members being mounted one on the holder and the other on the carrier, adjustment of the gauge means being obtained by relative movement radially between the mating member and the arcuate openings.

5. The angle gauge and cutter of claim 1 in which the adjustable gauge means comprises a plate on the holder having a plurality of different arcuate openings differently spaced radially thereon and a mating pin on the carrier adjustable radially thereof.

6. The angle gauge and cutter of claim 3 in which the gauge means comprises a member having a plurality of different arcuate openings differently spaced radially of the said axis and a mating member adjustable radially of said axis, the said members being mounted one on the holder and the other on the carrier, adjustment of the gauge means being obtained by relative movement radially between the mating member and the arcuate openings.

7. The angle gauge and cutter of claim 3 in which the pivotal axis of the carrier and the apex of the angle of the segment to be cut are coincident and in which the adjustable means comprises a plate on the holder having a plurality of different arcuate openings differently spaced radially thereon and a mating pin on the carrier adjustable radially thereof.

PATRICK JOSEPH McGARVEY.